United States Patent [19]
Andersson

[11] Patent Number: 5,850,473
[45] Date of Patent: Dec. 15, 1998

[54] METHOD AND APPARATUS FOR COMPENSATING FOR COLOR VARIATION IN A VIDEO SYSTEM

[75] Inventor: Russell L. Andersson, Manalapan, N.J.

[73] Assignee: Lucent Technologies Inc., Murray Hill, N.J.

[21] Appl. No.: 782,008

[22] Filed: Jan. 7, 1997

[51] Int. Cl.⁶ ...................................................... G06K 9/00
[52] U.S. Cl. ........................... 382/165; 382/103; 382/167
[58] Field of Search ...................................... 382/103, 162, 382/165, 167, 274; 348/578, 599

[56] References Cited

U.S. PATENT DOCUMENTS 5,400,081  3/1995  Chaplin .................................... 348/587

Primary Examiner—Phuoc Tran

[57] ABSTRACT

Compensating for color variations affecting color detection by a video system. In one aspect, compensation for highlights of a prop having multiple color regions is provided. The prop is preferably designed so that every color region of the prop is affected by highlights at the same rate. The color mix ratio for a color region of the prop representing the deviation of the color region from a nominal color value is computed, and an expected color for each color region of the prop is then computed based on the color mix ratio. In another aspect, compensation for variations in a light source illuminating the environment detected by the video system are provided in combination with highlight compensation. A white color balance ratio for a frame of video data is estimated, the color ratios of background white pixels are detected and these ratios are then used to continually update the estimate of the white color balance ratios.

15 Claims, 5 Drawing Sheets

METHOD AND APPARATUS FOR COMPENSATING FOR COLOR VARIATION IN A VIDEO SYSTEM

FIELD OF THE INVENTION

The present invention relates generally to color recognition in a video system. More particularly, the invention relates to compensation for color variations due to highlighting, variations in light sources, and the like, in order to achieve accurate color recognition.

BACKGROUND OF THE INVENTION

It is possible to achieve a low-cost, versatile controller for a video system by providing a passive, multicolor prop which can be detected by a camera which is part of the video system, and can be used to provide inputs to the video system, for example, as part of the play of a video game. The video system detects different-colored regions on the prop as part of interpreting the position and motion of the prop to provide the required inputs.

One problem that manifests itself in such a system is that the prop color detected by the camera will actually change. These changes will occur because of changes in the location and orientation of the prop. Such changes cause light to be reflected off the prop in different directions. Further, changes will occur because of long-term changes and short-term fluctuations in the room lighting. In order for the video system to accurately detect the motion of the prop and to use the prop to provide accurate inputs for video game play or a virtual reality system, it is highly desirable to compensate for these color changes.

Prior art color compensation techniques have included the use of a frame buffer. The use of a frame buffer allows the retention of image information, so that an object under consideration can be examined at leisure. The information can remain in the buffer so long as it is needed. It is thus possible to follow a color change, or other pertinent information. The use of a frame buffer, of course, requires the use of additional circuitry, memory, and processing components in order to provide a frame buffer and use the buffer to analyze the behavior of various regions of an object. It is desirable to employ a video system which senses a prop and which compensates for apparent color variations of the prop in a video game system or virtual reality device designed and priced for home use. Therefore, it is desirable to employ a simple, inexpensive method of color compensation which employs minimal processing and which preferably operates without the need for a frame buffer or similar complicated circuitry.

SUMMARY OF THE INVENTION

The present invention is able to track the expected color of a prop by tracking only a single observable color ratio. Usually this ratio is that of the color blue or the color red which is furthest from white. In order to achieve this end, it is necessary to be able to obtain a reliable color measurement of a single spot, usually a spot in the middle of a homogeneous region. A prop includes one or more color regions, which "white out" as the surface of the prop becomes less and less perpendicular to the line of sight of the camera. The prop is designed so that all color regions white out in a uniform manner as the orientation and position of the prop is changed. In this way, the system of the present invention is able to update information about all color regions of the probe, even when only one color region is tracked.

In one aspect of the present invention, the observed color is computed as a mix fraction whose value indicates the extent to which the colors have whited out. The system stores values representing the nominal color value of the color region, and the maximum whited value. The nominal value of the color region is the value when no whiting out has occurred. In other words, the value of the color region when the color region is perpendicular to the light coming from a light source. The system then takes the difference between the observed value of the region and the nominal value and divides it by the difference between the maximum whited value and the nominal value. The ratio thus obtained is a mix value representing the degree of whiting.

The color ratio for all other observable color regions is then updated. On the expectation that all regions of the prop white out at the same rate, the ratio for each region is computed by multiplying the mix value by the range between nominal value and maximum whiting and adding this value to the nominal value. This computation will yield an expectation for each color region of a color whited to the same extent as the tracked color region.

DETAILED DESCRIPTION

Figure 1A:
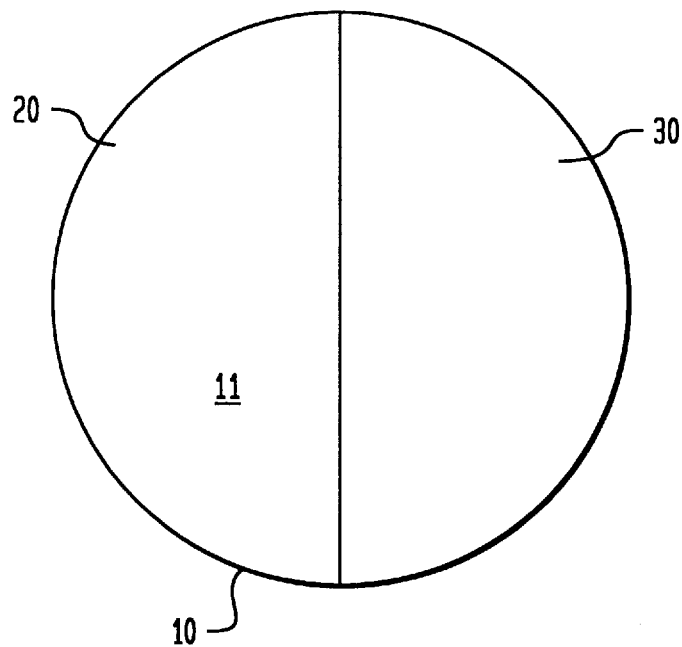
FIGS. 1A and 1B illustrate two views of a multicolor prop suitable for use in a video system employing the highlight compensator of the present invention.
Figure 1B:
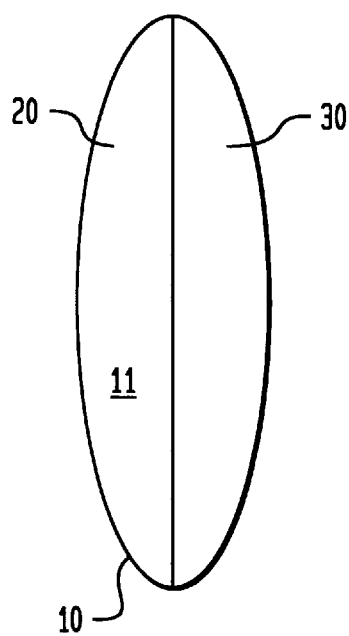
Figure 2:
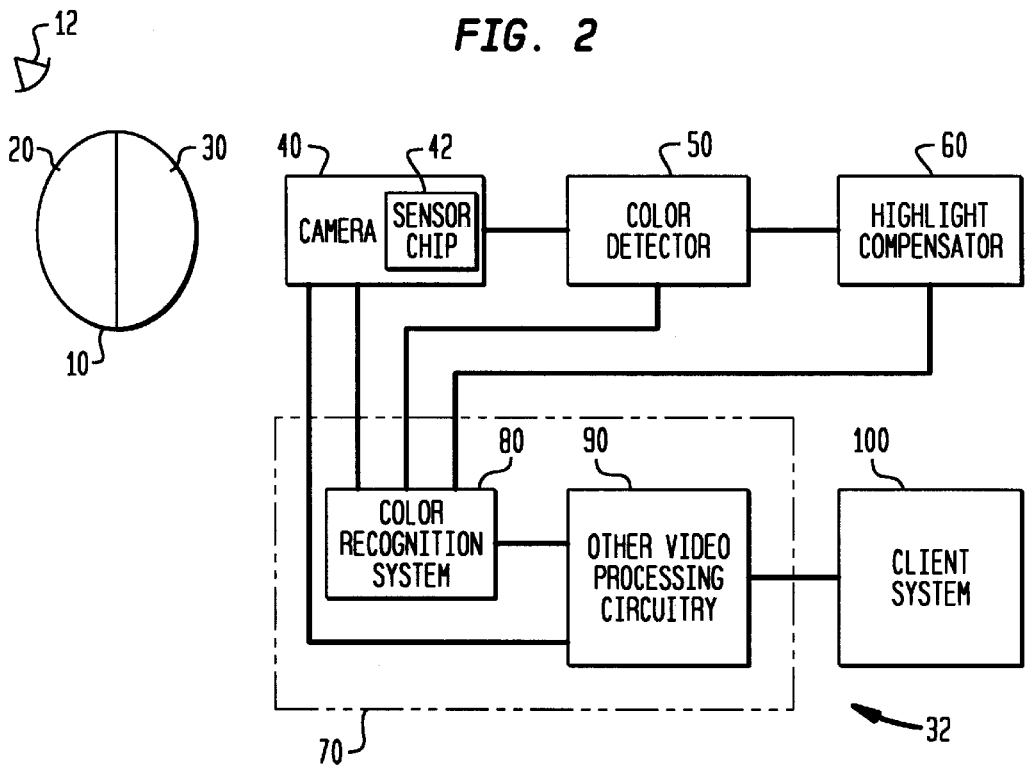
FIG. 2 illustrates a video system employing a highlight compensator in accordance with the present invention.

FIGS. 1A and 1B illustrates two different views of a prop 10 which may be employed as a video input device in video systems employing a highlight compensator in accordance with an embodiment of the present invention as it might present its surface 11 to a light source 12 or a camera 40, both of which are shown in FIG. 2. The motion and orientation of prop 10 is sensed by a video system described in greater detail in connection with the discussion of FIG. 2, and is translated into control inputs which control the behavior of the video system. For simplicity in illustration, prop 10 consists of red region 20 and blue region 30, but it will be recognized that a prop employed in the present invention may suitably consist of multiple color regions of varying shapes. Prop 10 reflects light differently when oriented differently to a light source, and the differing reflection causes the different regions of prop 10 to change color as the orientation of the prop 10 changes. Typically, prop 10 tends more toward white the more the orientation of the plane of the surface 11 of prop 10 moves away from perpendicular to the light source 12. In the highlight compensator of the present invention, red region 20 and blue region 30 of prop 10 tend toward white at the same rate, regardless of the orientation of prop 10 to light source 12. This is achieved by designing the prop to be planar or to have the regions on parallel planes. Further, the regions 20 and 30 should preferably be of the same material, so that the reflective characteristics are uniform throughout the prop 10.

FIGS. 1A and 1B show the same prop 10 with its surface 11 oriented differently with respect to light source 12 and camera 40. As prop 10 is oriented differently to light source 12 in FIGS. 1A and 1B, the camera 40 of the video system 32 of FIG. 2 will sense color regions 20 and 30 of prop 10 differently as prop 10 moves from the position of FIG. 1A to the position of FIG. 1B. Highlighting occurs when the prop assumes certain positions with respect to the lighting and the camera. It should be noted that the lighting may include multiple sources such as an incandescent light, fluorescent lighting, daylight or a combination of sources.

As will be addressed further below, the highlight compensator of the present invention is able to compensate for color variations in prop 10 caused by highlighting. Color ratios of color regions of prop 10 vary due to highlighting along a range from the nominal value of a color region 20 or 30 to an end value. The highlight compensator of the present invention detects a designated color ratio of a color region 20 or 30 of prop 10 and computes the degree of whiting to which that color region has been subjected. This is done by computing the percentage degree of deviation from the nominal value to the maximum white value which the color region 20 or 30 of interest has experienced. The highlight compensator of the present invention then computes an expected color ratio for each color ratio of each color region 20 or 30, which is the nominal value of the color ratio, moved toward white by the same percentage as was detected in the color ratio which was actually measured. These expected values are used as new expected values of the appropriate color regions of prop 10.

FIG. 2 illustrates a video system 32 employing an embodiment of the present invention. Video system 32 includes the camera 40, a color detector 50, a highlight compensator 60, a video processor 70, and a client system 100. The highlight compensator 60 is illustrated in greater detail in FIG. 3. The video processor 70 includes color recognition system 80, as well as other video processing circuitry 90 necessary to receive and process inputs from the camera 40. For generation of color data, the camera 40 may suitably employ, for example, a Sony ICX054AK CCD sensor chip 42. Sensor chip 42 uses four primary filters: cyan (C), green (G), yellow (Y), and magenta (M). They are laid out in an interleaved pattern at a full 492 vertical line resolution, such that different pairs of lines are added during even and odd fields, resulting in an interleaved image with 246 vertical lines. This parallel addition is performed internal to, and is intrinsic to the sensor chip 42. By adding adjacent lines to form the output signal, sensor chip 42 reduces vertical luminance aliasing. Each video line is read out as a string of pixels at the horizontal pixel resolution of 510 pixels across. After the addition the measured values are C+G, Y+G, C+M, Y+G (even line) or C+M, Y+G, C+M, Y+G (odd line). Further camera processing does two things: adds adjacent pixels, to produce luminance C+G+Y+M; and subtracts adjacent pixels to produce two chrominance values, red ($C_r$) and blue ($C_b$): $C_r$=(Y+M)−(C+G) or $C_b$= (C+M)−(Y+G). The camera 40 provides the luminance $C_r$ and $C_b$ chrominance values discussed above to the video processor 70 and to the color detector 50. Color detector 50 provides inputs to the highlight compensator 60 and to the video processor 70, specifically to the color recognition system 80. The highlight compensator 60 also provides inputs to the color recognition system 80 in the video processor 70. Color recognition system 80 provides inputs to the other video processing circuitry 90 in video processor 70. The other video processing circuitry 90 delivers inputs which are utilized in the control of the client system 100. Camera 40 provides video signals relating to the environment in which it operates, including video signals relating to prop 10. Color detector 50 transmits color information to color recognition system 80, which is recognizes the color regions of prop 10 provides control inputs. For a two-color prop, the color detector 50 transmits color information to the color recognition system 80 in two color channels, one channel for each color of the prop 10. Color recognition system 80 tracks a red color ratio $C_r/Y$ and a blue color ratio $C_b/Y$ for each color channel. The colors of prop 10 are preferably chosen so as to be easily distinguishable from background objects. Color detector 50 provides a color ratio from one color channel to highlight compensator 60. Highlight compensator 60, as discussed further below, uses this color ratio to update all color ratios of all color channels. Highlight compensator 60 provides inputs to color recognition system 80, which then uses these inputs to correct its color expectations for the colors of the color regions 20 and 30 of prop 10, in light of highlighting effects resulting from changes in the orientation of prop 10. The color regions of prop 10 can thus more accurately be recognized and employed to provide control inputs.

Figure 3:
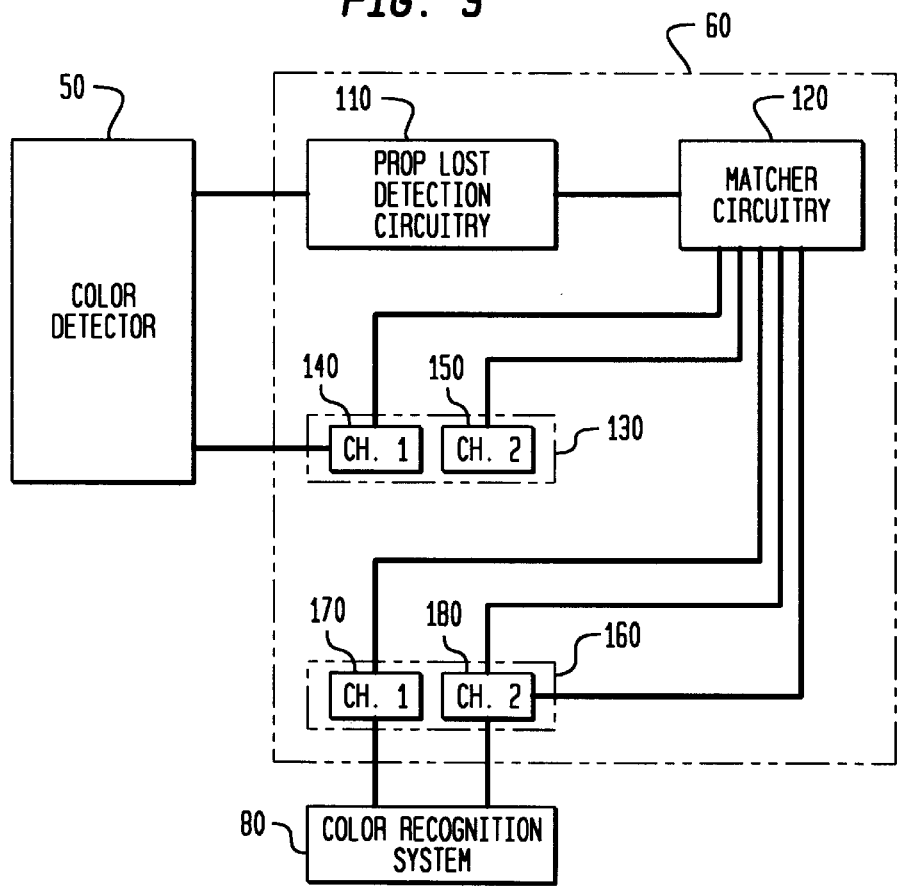
FIG. 3 is a more detailed illustration of the highlight compensator of FIG. 2.

FIG. 3. provides a more detailed illustration of the highlight compensator 60. Color detector 50 and color recognition system 80 are included for clarity of illustration. The highlight compensator 60 includes prop lost detection circuitry 110; color channel 130; including, in this illustration, $channel_1$ 140 and $channel_2$ 150; matcher circuitry 120; and color expectation circuitry 160, including, in this illustration, $channel_1$ expectation circuitry 170 and $channel_2$ expectation circuitry 180. The prop lost detection circuitry 110 and color channel 130 receive inputs from the color detector 50. Prop lost detection circuitry 110 provides the signal PROP LOST to matcher 120. Color channel 130 provides a color ratio input from one color channel of channel 1 170 or channel 2 180 to matcher 120. Matcher 120 uses the input from color channel 130 to construct expectations for all color ratios for all color channels employed. In the example shown, this will be the two channels, $channel_1$ and $channel_2$. This process will be described in greater detail below in connection with FIG. 4.

Matcher 120 provides color expectations to the color expectation circuitry 160. Color expectation circuitry 160 in turn provides channel expectations to the color recognition system 80. Color recognition system 80 also receives actual color inputs from the color detector 50. By simultaneously receiving color expectations from color expectation circuitry 160, color recognition system 80 is able to compensate for whiting or highlighting of prop 10 resulting from changing orientations of prop 10 with respect to light source 12.

Figure 4:
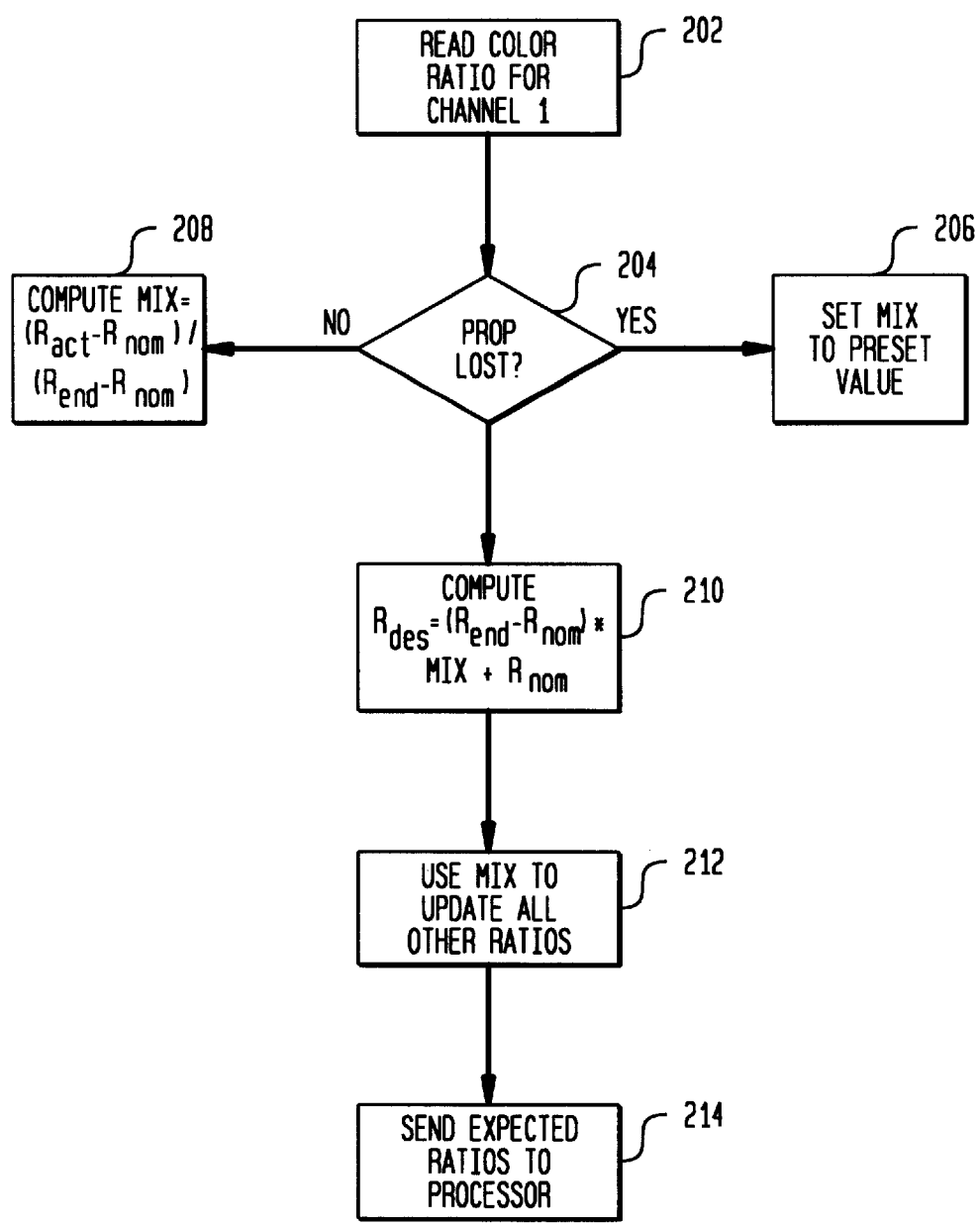
FIG. 4 is a flowchart illustrating the details of an embodiment of the highlight compensator of FIG. 3.

FIG. 4 is a flowchart illustrating the steps of a process which may suitably be performed by the highlight compensator 60 in compensating for whiting out of prop 10. The highlight compensator 60 employs a mix ratio varying between 0 and 1, with the maximum whiteness which the prop colors can achieve being given a value of 1, and the nominal values of the prop colors being given a value of 0. The mix value provides video processor 70 with information needed to compensate for whiteness caused by changes in orientation of prop 10, thereby allowing for accurate recognition of different-colored regions of prop 10.

In step 202, matcher 120 receives a color ratio from channel$_1$ 140. For illustrative purposes this is chosen to be the ratio $C_r/Y$. In practice, the color ratio received by the matcher 120 is preferably chosen to be the ratio providing the strongest signal and the least noise. In the illustrated embodiment, channel$_1$ 140 receives $C_r/Y$ and $C_b/Y$ ratios and $C_r/Y$ and $C_b/Y$ ratios from each of channel$_1$ 140 and channel$_2$ 150. However, because prop 10 is preferably designed so that all color regions white out at the same rate, matcher 120 only needs to receive one color ratio as described in this example, the $C_r/Y$ ratio from channel$_1$ 140. Using the information provided by the color ratio received, matcher 120 is able to update all other color ratios. Matcher 120 receives the PROP LOST signal from prop lost detection circuitry 110 at the same time as it receives the $C_r/Y$ color ratio from channel$_1$ 140. In step 204, matcher 204 checks to see if the PROP LOST signal indicates that prop 10 has been lost. If prop 10 has been lost, control is transferred to step 206 and the mix value is set to a predetermined figure. This predetermined figure is preferably a figure somewhat greater than zero, but which will still allow lockin at a mix of 0. If the PROP LOST signal indicates that prop 10 has not been lost, control is transferred to step 208 and a mix value is computed. This mix value represents the degree of whiteness that prop 10 has achieved. In one presently preferred embodiment, the mix value is given by the formula:

$$\text{mix} = (R_{act} - R_{nom})/(R_{end} - R_{nom})$$

where $R_{act}$ is the actual ratio received, $R_{nom}$ is the nominal (highlight-free) ratio, and $R_{end}$ is the ratio of the maximum white value.

In step 210, a desired ratio is computed using the following formula:

$$R_{des} = \text{mix}*(R_{end} - R_{nom}) + R_{nom}.$$

This computation is performed for each ratio in each channel, following the expectation that the mix ratio changes at the same rate for all ratios. That is, each color ratio may have a different nominal ratio, may have a different maximum whiteness, and may have a different range between the nominal value and the maximum white value. Nevertheless, prop 10 can be designed in such a way that each color region moves the same percentage of the way toward white as every other region. Thus, matcher 120 computes the desired color ratio $R_{des}$ for every color ratio, using the specific nominal and end values for each color region, but employing the mix ratio computed by observing the red ratio of channel$_1$. In step 212, matcher 120 updates the color ratio expectation for each ratio in each channel and sends these values to color expectation circuitry 160. In step 214, color expectation circuitry 160 sends the expected ratio values to the color recognition system 80. Color recognition system 80 is then able to use the updated expected values to extract them from the signal received from color detector 50, thus enabling color recognition system 80 to accurately recognize different-colored regions of the prop 10.

As described above, the highlight detector of the present invention is able to employ simplified circuitry and processing. By selecting prop 10 to white out at the same rate over all color regions, the highlight detector is able to update potentially many color regions through a simple mathematical computation, while performing the more sophisticated and difficult function of color monitoring for only one color region. The highlight detector of the present invention is therefore more amenable to implementation in a simple, low-cost environment such as that of a home video game.

One further problem which manifests itself in a video system employing color tracking is that the color of the light source may change. Thus, the color of the object being tracked may change as a result of changes in the light source, causing incorrect results. This is particularly true when, for example, a fluorescent light operates at a frequency different than that of a video camera. In such a case, the color of the object being tracked will vary due to mismatch between the frequency of the video camera and the frequency of the light source.

Another embodiment of the present invention works in combination with the above described embodiment to further compensate for variations in a fluorescent or other light source by monitoring and tracking the ambient background light, measuring and compensating for a "white balance" ratio. While this is a common technique in analog video cameras, the present invention implements white balance compensation in a digital video system, which may be produced simply and at relatively low cost.

The white balance compensation system estimates the color difference ratios, that is, the $C_b/Y$ and $C_r/Y$ ratios, for background "white" objects. This is accomplished by computing the deviation from white for all pixels, selecting those for which the deviation is below a certain predetermined value, and then counting the number of pixels for which d>0 and the number for which d<0. These counts are then used to create a ratio which is then used as an error function to drive a servo loop to update the estimate of the white balance color ratio W. Calculations for both $C_r$ and $C_b$ may be performed at each frame of video data, or they may be done on alternative frames, saving hardware.

Figure 5:
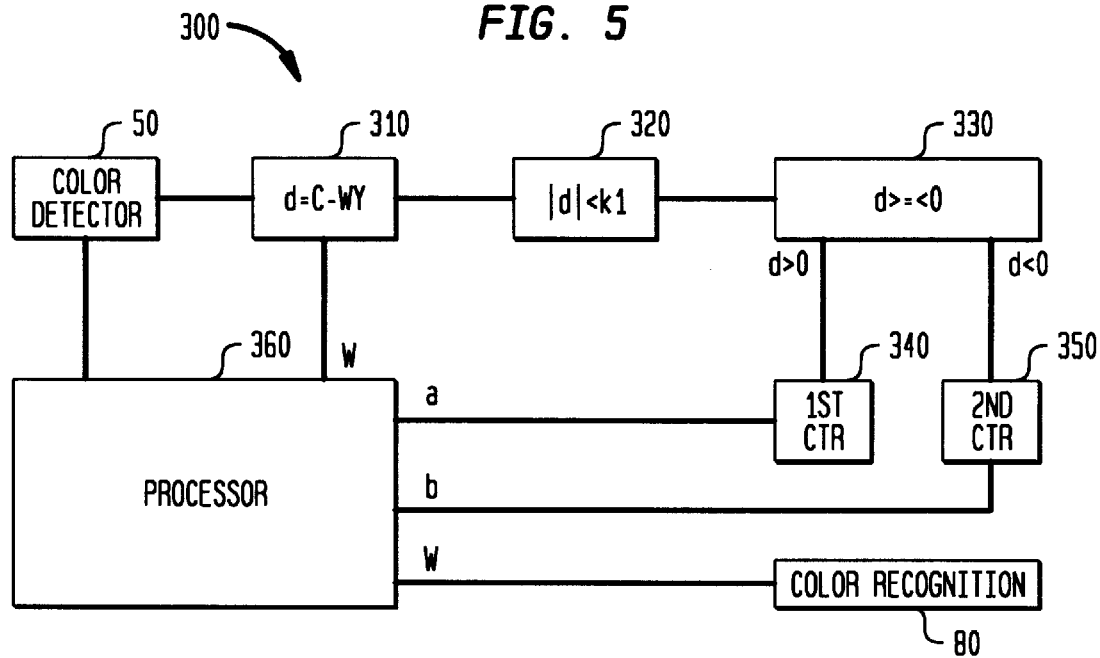
FIG. 5 is a diagram illustrating a white balance compensator which may suitably be used in conjunction with a highlight compensator of FIG. 3 in accordance with an aspect of the present invention.

FIG. 5 illustrates an embodiment of a white balance compensation system 300 suitable for use in conjunction with the highlight compensator 60. Color detector 50 and color recognition system 80 are shown for clarity. The illustrated white balance compensation performs compensation over alternate frames, with calculations for $C_r$ and $C_b$ being performed on alternate frames. White balance compensation system 300 includes deviation computing circuitry 310, comparator 320, zero comparator 330, first counter 340, second counter 350, and processor 360. As a representative example, white balance compensation system 300 begins by processing red pixels. For each pixel in a frame of video data, color detector 50 provides an input to deviation computing circuitry 310. Deviation computing circuitry 310 computes the deviation from white d for each pixel, using the formula $d = C - W*Y$, where d is deviation, C is the detected color of the pixel, W is the estimated white balance color ratio, and Y is the luminance of the pixel. Deviation computing circuitry 310 then provides the deviation value d to comparator 320. Comparator 320 takes the absolute value of d and compares it to a predetermined value k1. Pixels with an absolute value of d less than k1 are considered white. For each pixel with an absolute value of d less than k1, comparator 320 passes the value of d along to zero comparator 330. For each pixel with d greater than 0, zero comparator 330 sends a signal to first counter 340. For each signal received from zero comparator 330, first counter 340 increments the value of a first count a by 1. For each pixel with d greater than 0, zero comparator 330 sends a signal to second counter 350. For each signal received from zero comparator 330, second counter 350 increments the value of a second count b by 1. The values of a and b indicate the number of pixels with excessive or inadequate color values, respectively, among the white background pixels.

First counter 340 and second counter 350 provide the values of the counts a and b to processor 360. Processor 360 employs the values of the counts a and b to construct the ratio (a−b)/(a+b). Processor 360 stores this ratio, and then the process is repeated for blue pixels in the next frame. Processor 360 then employs the red and blue (a−b)/(a+b) ratios as an error function to drive a servo loop which computes the white color balance ratio W. Processor 360 provides this updated value of W to deviation computing circuitry 310 for use in updating the value of W, and also to the color recognition system 90 in order to compensate for the white color balance ratio of the light source.

Figure 5A:
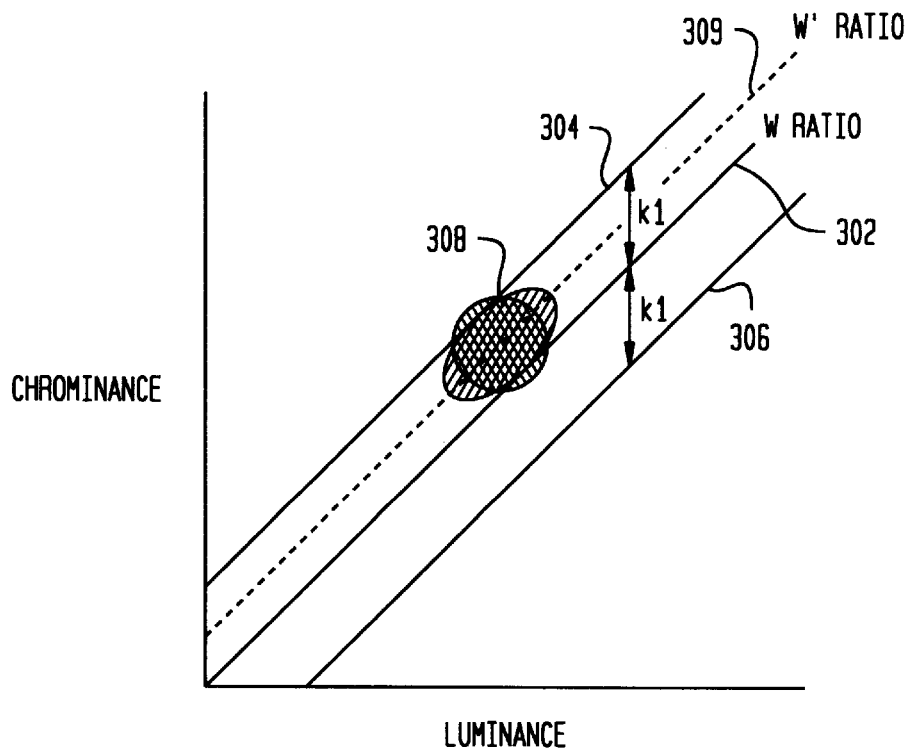
FIG. 5A is a graph illustrating the chrominance/luminance ratios of background white pixels in a situation in which the white balance ratio would be increased.

FIG. 5A is a sample plot of chrominance versus luminance for a sample set of background white pixels. A W ratio curve 302 is a curve illustrating the W ratio, or the existing nominal chrominance-luminance relationship. Upper boundary curve 304 and lower boundary curve 306 are curves of positive and negative differences of k1 from W: that is, the boundaries for pixels with deviation d or less from W. All pixels which are considered as background white pixels will fall between the upper boundary curve 304 and the lower boundary curve 306. Pixels which fall between upper boundary curve 304 and W ratio curve 302 contribute to the d>0 count, or "b" count. Pixels which fall between lower boundary curve 306 and W ratio curve 302 contribute to the d<0 count, or "a" count. Shaded area 308 represents the background white pixels in a sampling of data. In the situation illustrated by FIG. 5A, a very large number of background white pixels have a positive deviance d and thus lie between upper boundary curve 304 and W ratio curve 302. Very few pixels lie between lower boundary curve 306 and W. ratio curve 302. The value of b is thus much greater than the value of a. White balance compensation system 300 thus uses the values of a and b to construct a new white balance ratio W' 309 which is greater than the original white balance ratio W. In the example illustrated in FIG. 5A, the new white balance ratio W' lies approximately midway between upper boundary curve 304 and W ratio curve 302. The pixels with positive and negative deviances d are approximately equally spaced around the new white balance ratio W', and the values of a and b are approximately equal.

Figure 5B:
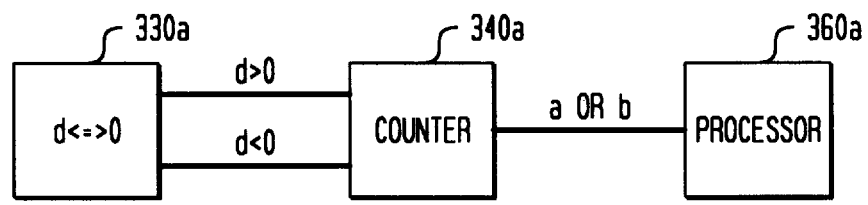
FIG. 5B is an alternative configuration of a portion of the white balance compensator illustrated in FIG. 5, representing an alternative embodiment of a white balance compensator.

FIG. 5B illustrates a second white balance compensation system 400 which may suitably be used in conjunction with the highlight compensator 60. In this embodiment, calculations for $C_r$ and $C_b$ are performed on the same frame. Color detector 50 and color recognition system 80 are shown for clarity. White balance compensation system 400 includes red deviation computing circuitry 402, red comparator 404, red zero comparator 406, red first counter 408, red second counter 410, blue deviation computing circuitry 412, blue comparator 414, blue zero comparator 416, blue first counter 418, blue second counter 420, and processor 422. For each frame, red deviation computing circuitry 402 computes d for red pixels, red comparator 404 compares d against k1, red zero comparator 406 compares d against zero, and first red counter 408 and second red counter 410 compute a and b, respectively, for red pixels. Similarly, in the same frame, blue deviation computing circuitry 412 computes d for red pixels, blue comparator 414 compares d against k1, blue zero comparator 416 compares d against zero, and first red counter 418 and second red counter 420 compute a and b, respectively, for blue pixels. The figures a and b for red and blue pixels are supplied to processor 422, which computes the ratio (a+b)/(a−b) for red and blue pixels, and uses this ratio to recompute W.

Figure 5C:
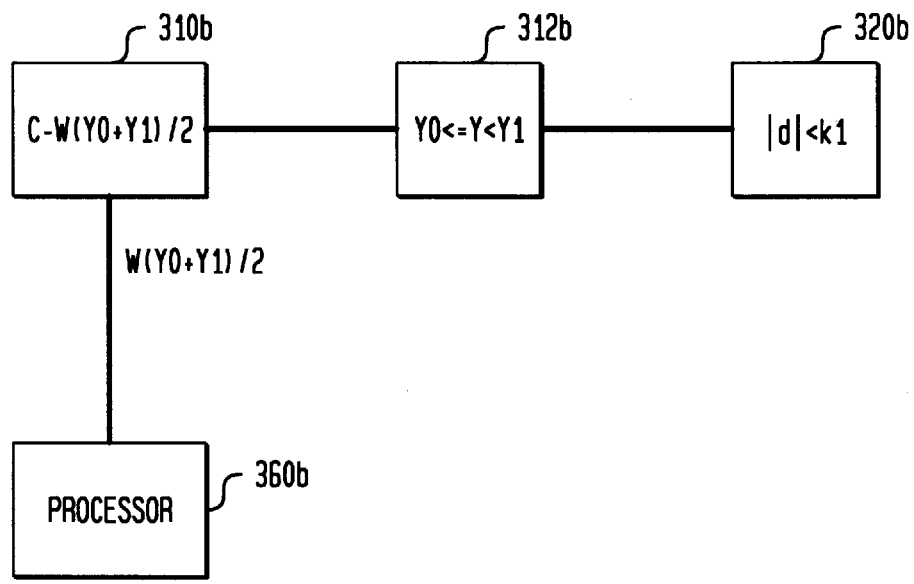
FIG. 5C is a further alternative configuration of a portion of the white balance compensator illustrated in FIG. 5.

The white color balance compensator of the present invention may be further simplified by eliminating the multiplication W*Y. This is done by selecting only pixels where Y0≦Y<Y1, typically with Y0 mod 16 equal to 0 and Y1−Y0 equal to 16, where Y0 is some midrange intensity which usually has a comparatively large number of white pixels. FIG. 5C illustrates this embodiment of the present invention. Processor 360b precomputes W(Y0+Y1)/2 and supplies it to deviation computing circuitry 310b. Deviation computing circuitry 310b computes deviation d=C−W(Y0+Y1)/2 and supplies this value to luminance comparator 312b. Luminance comparator 312b compares the luminance Y of the pixel under consideration against the criterion Y0≦Y<Y1. If the pixel meets the criterion, the value of d is then passed along to comparator 320a. Otherwise, the value of deviation d for that pixel is discarded. The remaining computations proceed as described above in conjunction with FIG. 5. Deviation computing circuit 310b, then, may be implemented merely by a subtractor, rather than a subtractor and a multiplier. So long as the white pixels are spread out over the intensity ranges, this approach provides a substantial circuit simplification. Since fewer pixels are under consideration, the values of counts a and b are smaller. This allows the use of a counter or counters with fewer bits, for an additional hardware savings.

While the present invention is disclosed in the context of a presently preferred embodiment, it will be recognized that a wide variety of implementations may be employed by persons of ordinary skill in the art consistent with the above discussion and the claims which follow below.

I claim:

1. A method of tracking a moving prop having one or more color regions, each of said color regions being subject to deviation from a nominal value, comprising the steps of:

observing a color ratio of one of said color regions of said moving prop;

for each of said color regions, updating an expected color ratio based on said observed color ratio; and employing said expected color ratio for detecting said color region of said moving prop.

2. A method of tracking a prop having one or more color regions, each of said color regions being subject to deviation from a nominal value, comprising the steps of:

observing a color ratio of one of said color regions of said prop;

for each of said color regions, updating an expected color ratio based on said observed color ratio;

employing said expected color ratio for detecting said color region of said prop; and detecting a loss of tracking of said prop.

3. The method of claim 2 further comprising the step of employing a default observed color ratio when said loss of tracking of said prop is detected.

4. A method of tracking a prop having one or more color regions, comprising the steps of:

detecting a color ratio for a selected color region of said prop;

computing for said color region a mix ratio, said mix ratio representing a proportional deviation from a nominal color value of said color region;

computing for each of said color regions of said prop a desired color, said desired color being the sum of said nominal color and the product of said mix ratio and a difference between said nominal color and a maximum whiteness of said color region; and employing said desired color of each of said color regions in tracking said color regions.

5. The method of step 4 and further including clipping said mix ratio to a predetermined range.

6. The method of step 5 and further including the step of detecting loss of tracking of said prop.

7. The method of step 6 and further including the step of substituting for said mix ratio a predetermined mix ratio when a loss of tracking of said prop is detected.

8. A color compensation system, comprising:

a prop having a plurality of color regions, each of said color regions being subject to whiting out at an equal rate;

a detector for detecting a color ratio of a measured color region, said measured color region being one of said color regions;

a processor for:
(i) computing for said color region a deviation from a nominal value of said color region; and
(ii) computing for each of said color regions of said prop an expected color ratio, said ratio representing said nominal color of said color region, adjusted by said deviation from said nominal value of said measured color region.

9. A method of white balance compensation for a succession of frames of video data, comprising the steps of:

for each frame, estimating a white color balance ratio;

for each frame, also estimating color ratios for background white pixels;

employing said estimates of said color ratios to compute a new estimate of said white color balance ratio for each subsequent frame of video data; and also employing said estimates of said color ratios to compensate for variations in a light source affecting subsequent frames of video data.

10. A method of claim 9 further comprising a method for white balance compensation for a succession of frames of video data, each of said frames consisting of pixels, each of said pixels having a color, comprising the additional steps of:

for a first frame of video data, estimating a white color balance ratio for said first frame of video data;

establishing a criterion by which each of said pixels will be determined to be or not to be a background white pixel;

sequentially detecting said color of each of said pixels;

evaluating, for each pixel, said color of said pixel to determine if said pixel is a background white pixel;

employing said colors of said background white pixels to update said estimated white color balance ratio;

employing said estimated white color balance ratio as a new estimated white color balance ratio for determining a white color balance ratio for a subsequent frame of video data; and employing said estimated white color balance ratio to compensate for variations in a light source affecting said frame of video data.

11. The method of claim 10 where the step of evaluating, for each pixel, said color of said pixel to determine if said pixel is a background white pixel also includes the steps of:

computing, for each of said pixels, a deviation ratio, said deviation ratio representing a deviation from white of each of said pixels;

comparing said deviation ratio of each of said pixels against a predetermined value; and selecting as a background white pixel each of said pixels for which said deviation ratio is less than said predetermined value.

12. The method of claim 11, where the step of employing said colors of said background white pixels to update said estimated white color balance ratio further includes the steps of:

counting all of said background white pixels for which said deviation is less than zero;

counting all of said background white pixels for which said deviation is greater than zero;

employing said counts of said background white pixels to compute a ratio to be used as an error function; and employing said error function to drive a servo loop to update said white color balance ratio.

13. The method of claim 12, wherein said pixels to be evaluated are restricted to a predetermined range of luminance values, and wherein said step of computing a deviation ratio for each of said pixels includes precomputing a product of said estimated white color balance ratio and an average of said predetermined range of luminance values.

14. The method of claim 12, wherein said white color balance ratio is estimated over two frames of video data, said counts of said background white pixels being performed with respect to red color values of said pixels in one frame and with respect to blue color values of said pixels in an alternate frame.

15. The color compensation system of claim 8 further comprising a white color balance compensation system for a succession of frames of video data, where the color compensation system is adapted for use in a video system, said video system also employing a color detection system and a color recognition system, the white color balance compensation system comprising:

an arithmetic unit for:
(i) receiving from said color detection system a color value for each pixel in a frame of video data;
(ii) computing a deviation ratio for each of said pixels, said deviation ratio representing a deviation from white of each of said pixels;

a first comparator for selecting pixels of interest from among said pixels, said pixels of interest being pixels for which said deviation is less than a predetermined value;

a second comparator for evaluating said pixels of interest to determine which of said pixels of interest has a deviation of less than zero and which of said pixels of interest has a deviation of more then zero;

a first counter for counting those of said pixels of interest for which said deviation is less than zero;

a second counter for counting those of said pixels of interest for which said deviation is greater than zero;

a processor for:
(i) using said counts of said pixels to construct an error function;
(ii) using said error function to update said estimate of said color balance ratio;
(iii) providing said updated estimate of said color balance ratio to said color recognition system.

* * * * *